United States Patent
Ishidoshiro

(10) Patent No.: US 7,555,296 B2
(45) Date of Patent: Jun. 30, 2009

(54) WIRELESS LAN SYSTEM, METHOD FOR PROVIDING NETWORK SERVICES, AND MEDIUM STORING PROGRAM TO PROVIDE NETWORK SERVICES

(75) Inventor: Takashi Ishidoshiro, Nagoya (JP)

(73) Assignee: Buffalo Inc., Nagoya-shi (JP)

( * ) Notice: Subject to any disclaimer, the term of this patent is extended or adjusted under 35 U.S.C. 154(b) by 1013 days.

(21) Appl. No.: 10/268,966

(22) Filed: Oct. 11, 2002

(65) Prior Publication Data
US 2004/0071121 A1   Apr. 15, 2004

(30) Foreign Application Priority Data
Oct. 9, 2002  (JP)  ............................ 2002-295868

(51) Int. Cl.
H04Q 7/20 (2006.01)
H04B 7/00 (2006.01)
H04B 5/00 (2006.01)

(52) U.S. Cl. .................. 455/426.2; 455/41.1; 455/462; 455/41.2

(58) Field of Classification Search .............. 455/426.1, 455/426.2, 41.1, 465, 444, 67.11, 226.1, 455/41.2, 456; 370/338, 331, 336; 709/209
See application file for complete search history.

(56) References Cited

U.S. PATENT DOCUMENTS

| | | | | |
|---|---|---|---|---|
| 5,682,381 | A * | 10/1997 | Sekihata et al. | ............. 370/332 |
| 6,414,955 | B1 * | 7/2002 | Clare et al. | .................. 370/390 |
| 6,745,038 | B2 * | 6/2004 | Callaway et al. | ......... 455/456.1 |
| 6,807,226 | B1 * | 10/2004 | Suetsugu et al. | ............ 375/224 |
| 6,834,192 | B1 * | 12/2004 | Watanabe et al. | ........... 455/444 |
| 6,879,574 | B2 * | 4/2005 | Naghian et al. | ............. 370/338 |
| 6,980,522 | B2 * | 12/2005 | Boyle | ......................... 370/252 |
| 7,251,485 | B2 * | 7/2007 | Ikeda et al. | .............. 455/426.2 |
| 2002/0196761 | A1 * | 12/2002 | Kaneko | ...................... 370/338 |
| 2003/0012169 | A1 * | 1/2003 | Takatori et al. | ............. 370/338 |
| 2005/0059391 | A1 * | 3/2005 | Ikeda et al. | .............. 455/426.2 |

FOREIGN PATENT DOCUMENTS

| | | |
|---|---|---|
| EP | 1 045 609 | 10/2000 |
| EP | 1 093 316 | 4/2001 |
| JP | 6-232830 | 8/1994 |
| JP | 8-181695 | 7/1996 |
| JP | 2000-059372 A | 2/2000 |
| WO | WO 02/062091 | 8/2002 |

OTHER PUBLICATIONS

Office Action dated Dec. 15, 2004 issued in corresponding Korean Patent Application No. 10-2002-0064886.

* cited by examiner

Primary Examiner—Tilahun B Gesesse
(74) Attorney, Agent, or Firm—Westerman, Hattori, Daniels & Adrian, LLP.

(57) ABSTRACT

The conventional wireless LAN system has the difficulties in limiting the extent to which network services are provided simply by controlling the intensity of radio wave.

When the master unit 100 detects a mobile wireless terminal in its communication area (in step S100), it inquires of a plurality of slave units 200 and 300 if they are ready for communication with the mobile wireless terminal (in step S110). The master unit determines whether or not to provide network services to the mobile wireless terminal according to the combination of readiness for communication between each the slave units 200 and 300 and the mobile wireless terminal (in steps S120 and S125).

8 Claims, 8 Drawing Sheets

| Permission | Slave unit 1 | Slave unit 2 |
|---|---|---|
| × | ○ | ○ |
| ○ | ○ | × |
| × | × | ○ |

FIG. 8

WIRELESS LAN SYSTEM, METHOD FOR PROVIDING NETWORK SERVICES, AND MEDIUM STORING PROGRAM TO PROVIDE NETWORK SERVICES

BACKGROUND OF THE INVENTION

1. Field of the Invention

The present invention relates to a wireless LAN system, a method for providing network services, and a medium storing a program to provide network services.

2. Description of the Prior Art

Any known wireless LAN system is constructed of a radio terminal (which functions as the access point) and one or more mobile units. The radio terminal has an appropriate antenna so that the wireless LAN system provides network services within the reach of radio waves emitted by the antenna. The mobile unit also has an appropriate antenna so that it receives said network services within the reach of radio waves. Both radio terminals exchange communications in conformity with an appropriate standardized procedure.

There have recently appeared stores who permit their customers to use the access point therein. If such stores are close to each other, they are required to intentionally limit the range of their network services. A conventional way to achieve this object is to limit the intensity of radio waves emitted by the wireless terminal at the access point.

The wireless LAN system of conventional type mentioned above has the difficulties in limiting the range of network services simply by controlling the intensity of radio waves, depending on the environmental conditions such as line-of-sight distance.

Although it is possible to limit only directionality by using directional antennas, this does not solve the problem with the distance of radio wave propagation. Although it is also technically possible to use highly active directional antennas (such as active array antennas), this is not a practical solution in view of their high cost for simple network services.

SUMMARY OF THE INVENTION

The present invention was completed in view of the foregoing. It is an object of the present invention to provide a wireless LAN system capable of easily limiting the range of communications for network services, a method for providing network services, and a medium storing a program to provide network services.

The present invention to achieve the above-mentioned object is directed to a wireless LAN system which comprises one master unit and one or more slave units, said master unit having a master antenna and functioning as the access point to provide network services to mobile wireless terminals according to an appropriate communication procedure within an appropriate communication area, said slave unit having a slave antenna and being capable of detecting whether or not it can communicate with said mobile wireless terminal, said master unit functioning in such a way that when it detects a wireless terminal within its communication area, it inquires about readiness for communication from said slave antenna to said mobile wireless terminal and then determines whether to provide network services to said mobile wireless terminal in accordance with the combination of readiness of communication between said slave unit and said mobile wireless terminal.

According to the present invention, the wireless LAN system comprises one master unit and one or more slave units. The master unit has a master antenna and functions as the access point to provide network services to mobile wireless terminals according to an appropriate communication procedure within an appropriate communication area. The slave unit has a slave antenna and is capable of detecting whether or not it can communicate with said mobile wireless terminal.

When the master unit detects a wireless terminal within its communication area, it inquires about readiness for communication from said slave antenna to said mobile wireless terminal and then determines whether to provide network services to said mobile wireless terminal in accordance with the combination of readiness of communication between said slave unit and said mobile wireless terminal.

It is assumed, for example, that a master unit and a slave unit are installed in a place outside the communication area and both units have communication areas which overlap with each other. When the mobile wireless terminals comes into its communication area, the master unit inquires the slave unit about whether or not the slave unit is also capable of communicating with this mobile wireless terminal. If the slave unit is also ready for communication, then it is understood that the mobile wireless terminal has come into the overlapped communication area. On the other hand, if the slave unit is not ready for communication, it is understood that the mobile wireless terminal has not come into the overlapped communication area.

Needless to say, it is possible to limit the communication range in an area in which communication with the master unit is possible but communication with the slave unit is impossible.

Therefore, by adequately combining the communication area of the master unit with the communication area of the slave unit so that a desired communication area is established, it is possible to simply limit the range of communication.

As explained above, the present invention provides a wireless LAN system which is so designed as to simply limit the range of communication which is established as desired by adequately combining the communication area of the master unit with that of the slave unit.

Incidentally, it is possible to install a plurality of slave units.

The advantage of the above-mentioned construction is that there are a plurality of communication areas for the slave unit and hence it is easy to adjust the communication area for the slave unit which overlaps with that of the master unit.

Moreover, the above-mentioned master unit may be constructed such that it permits all the slave units to provide network services when they are capable of communication according to the combination of readiness for communication between each slave unit and the mobile wireless terminal.

An example of the combination in the above-mentioned construction is such that the master unit permits all the slave units to provide network services when all the slave units are ready for communication.

The wireless LAN system of the present invention may be constructed such that the master unit permits the slave unit to provide network services in response to the combination of the slave unit capable of communication and the slave unit incapable of communication for the combination of readiness for communication between each slave unit and the mobile wireless terminal.

With the above-mentioned construction, it is possible to establish a communication range in a more complicated shape by controlling the slave units such that the communication range of the first slave unit overlaps with that of the second slave unit but does not overlap with that of the third slave unit.

In addition, the above-mentioned slave antenna may be a directional antenna. In this case, the slave antenna has directionality and hence by utilizing this directionality it is possible to establish a communication range in a more complicated shape.

In addition, the above-mentioned master antenna may be a directional antenna. In this case, the master antenna has directionality and hence by utilizing this directionality it is possible to establish a communication range in a more complicated shape.

By utilizing the antenna directionality in this way it is possible to establish a communication range in a more complicated shape.

The technique of limiting the range to which the master unit provides network services according to readiness for communication with the slave unit is not restricted to the one by tangible devices; but it is easily understood that the technique may manifest itself as a method. Therefore, the present invention may be directed to a method for providing network services through a wireless LAN system which comprises one master unit and one or more slave units, said master unit having a master antenna and functioning as the access point to provide network services to mobile wireless terminals according to an appropriate communication procedure within an appropriate communication area, said slave unit having a slave antenna and being capable of detecting whether or not it can communicate with said mobile wireless terminal, said master unit functioning in such a way that when it detects a wireless terminal within its communication area, it inquires about readiness for communication from said slave antenna to said mobile wireless terminal and then determines whether to provide network services to said mobile wireless terminal in accordance with the combination of readiness of communication between said slave unit and said mobile wireless terminal.

In other words, the present invention is directed a tangible device as well as a method for using it.

In the case where the concept of the present invention is embodied in software for the wireless LAN system, it naturally exists in the form a recoding medium which stores such software and it is used as software.

For example, the present invention may be directed to a medium storing a program for providing network services through a wireless LAN system which comprises one master unit and one or more slave units, said master unit having a master antenna and functioning as the access point to provide network services to mobile wireless terminals according to an appropriate communication procedure within an appropriate communication area, said slave unit having a slave antenna and being capable of detecting whether or not it can communicate with said mobile wireless terminal, said master unit functioning in such a way that when it detects a wireless terminal within its communication area, it inquires about readiness for communication from said slave antenna to said mobile wireless terminal and then determines whether to provide network services to said mobile wireless terminal in accordance with the combination of readiness of communication between said slave unit and said mobile wireless terminal.

Needless to say, the recording medium may be a magnetic recording medium or a magneto-optical recording medium or any one which would be developed in the future. It also includes primary and secondary duplicates in any form.

In addition, the concept of the present invention may be realized partly in the form of software and partly in the form of hardware. Alternatively, it may exist in such a form that a portion is recorded on a recording medium and read time to time as occasion demands.

In the case where the present invention is embodied in software, it is possible to use hardware and operating system in combination or separately. For example, it is possible to accomplish arithmetic processes by calling a specific function from the operating system or entering such a function through the hardware instead of calling. Even though the present invention is practically embodied in the presence of operating system, it is to be understood that the present invention can be practiced only by this program in an environment in which the program is circulated in the form recorded in a medium.

Moreover, in the case where the present invention is put into practice in the form of software, the invention is naturally realized as a medium which stores the program and also as the program itself. Thus the program itself is covered by the invention.

BRIEF DESCRIPTION OF THE DRAWINGS

FIG. 8 is a table showing the correspondence between the combination and its result in the case of the modified embodiment of the present invention.

DESCRIPTION OF THE PREFERRED EMBODIMENTS

The embodiments of the present invention will be described with reference to the accompanying drawings.

(1) The First Embodiment

Figure 1:
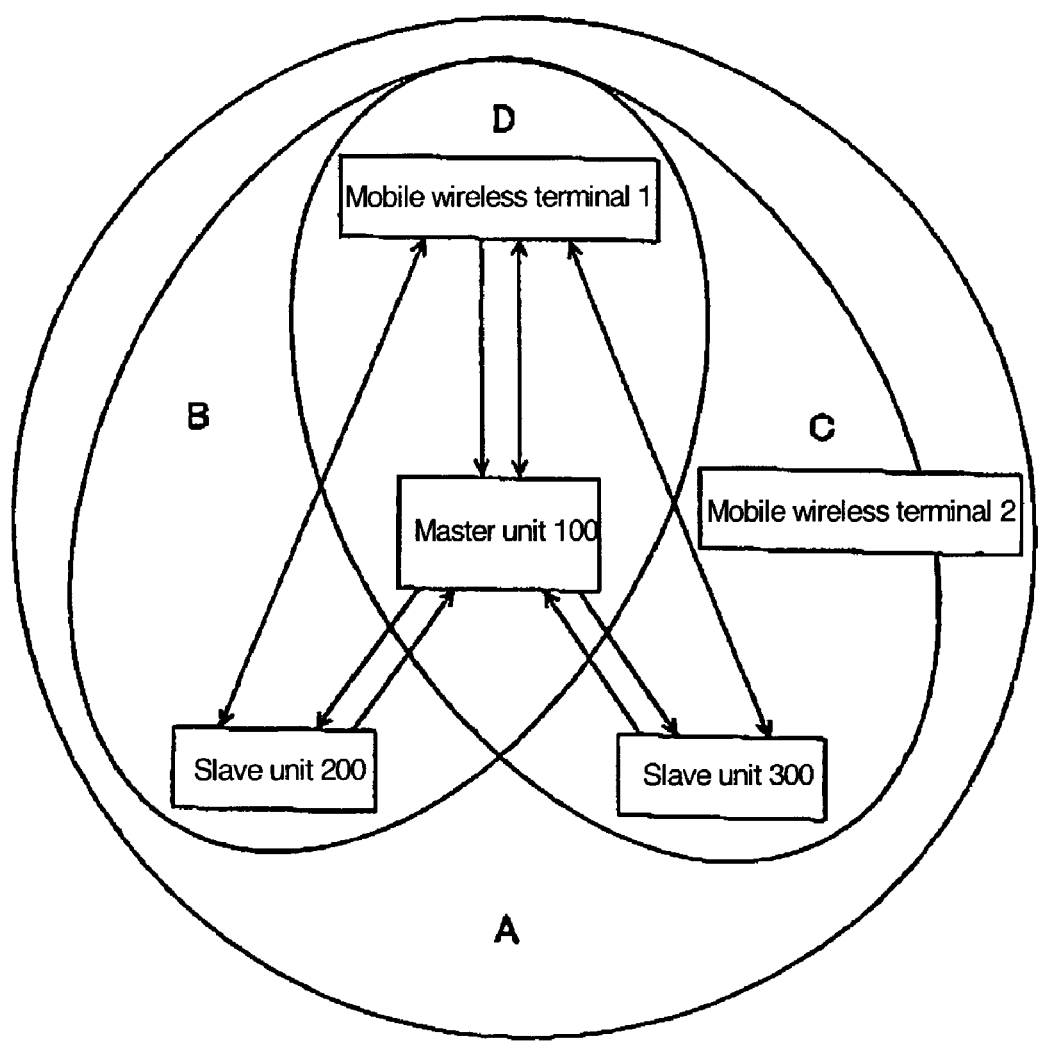
FIG. 1 is a schematic diagram showing the construction of the wireless LAN system pertaining to one embodiment of the present invention.

FIG. 1 is a schematic diagram showing the construction of the wireless LAN system pertaining to the first embodiment of the present invention.

One which provides network services has a master unit 100 and slave units 200 and 300. All of these units are wireless LAN terminals conforming to the standard of IEEE 802.11b.

Figure 2:
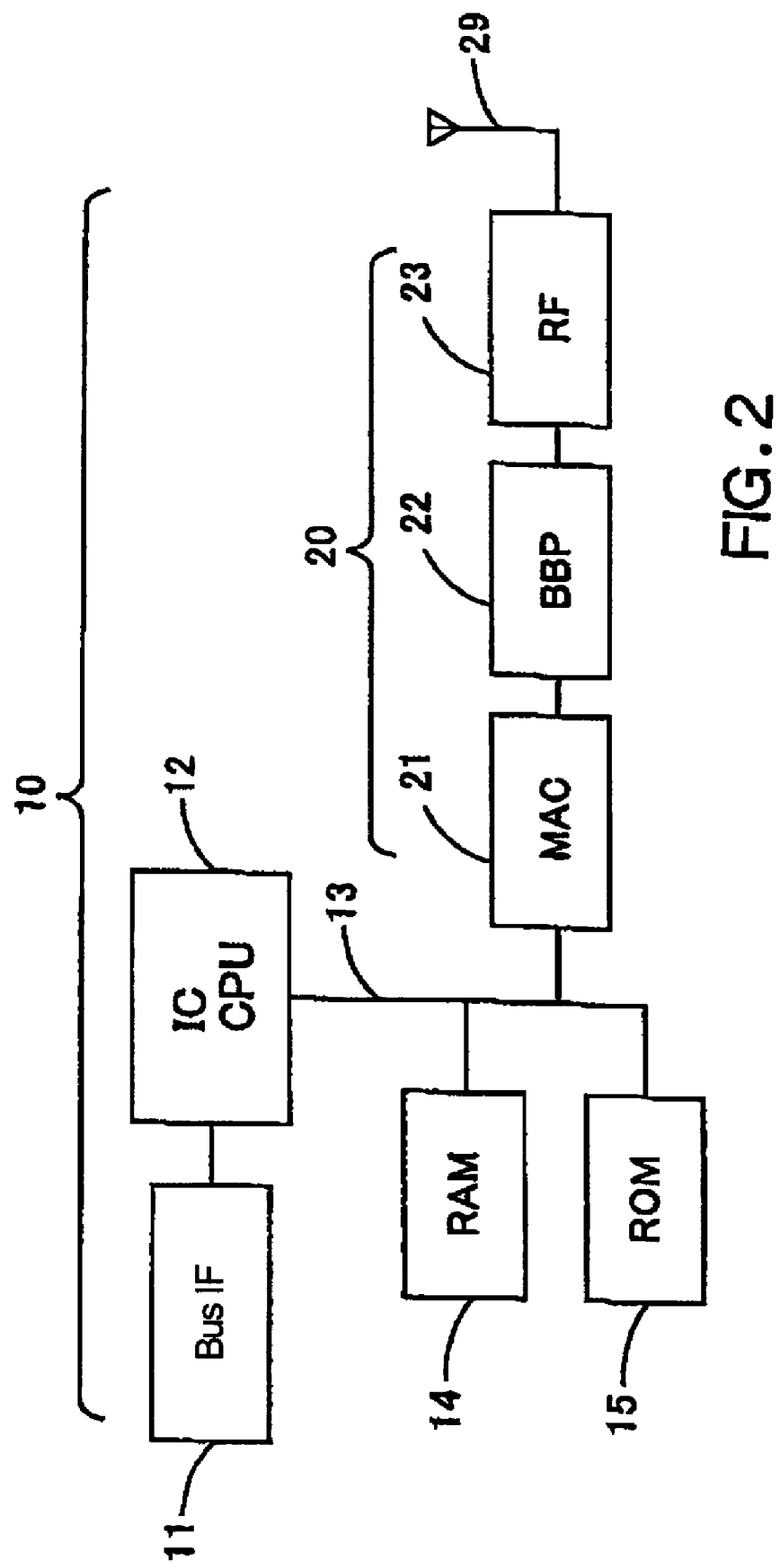
FIG. 2 is a block diagram showing the construction of the master unit and the slave unit.

FIG. 2 is a schematic block diagram showing the structure of the wireless LAN card used in each wireless terminal.

In this figure, the wireless LAN card 10 has the bus IF 11 which is an interface circuit for connection to the bus to which are attached computer peripherals (not shown), and it is also connected to the CPU 12 for its centralized control. The CPU 12 is connected to the internal bus 13, to which are connected the RAM 14 and the ROM 15. The CPU 12 executes appropriate arithmetic processing by using the storage area in the RAM 14 in accordance with the firmware and data stored in the ROM 15.

The bus 13 has a physical layer circuit 20 connected thereto. The physical layer circuits 20 consists of the MAC circuit 21, the baseband processor (BBP) circuit 22, and the radio circuit (RF) 23. The MAC circuit 21 controls medium access, and the radio circuit 23 transmits digital data over an appropriate frequency band, with the baseband processor circuit 22 interposed. In other words, these components constitute the wireless LAN conforming to the standard of IEEE 802.11b.

The antenna 29 is usually a non-directional antenna; however, it may also be a directional antenna. In this embodiment as shown in FIG. 1, the antenna 29 attached to the wireless LAN card of the master unit 100 is a non-directional one, and it covers a circular communication area A. The slave units 200 and 300 have directional antennas, so that the slave unit 200 covers an elliptical communication area B and the slave unit 300 covers an elliptical communication area C. In addition, the antennas 29 and 29 of the slave units 200 and 300 are oriented such that the communication areas B and C partly overlap with each other. The area D in which all the communication areas A, B, and C overlap one another is the area in which the network services are provided according to the embodiment of the present invention.

Figure 3:
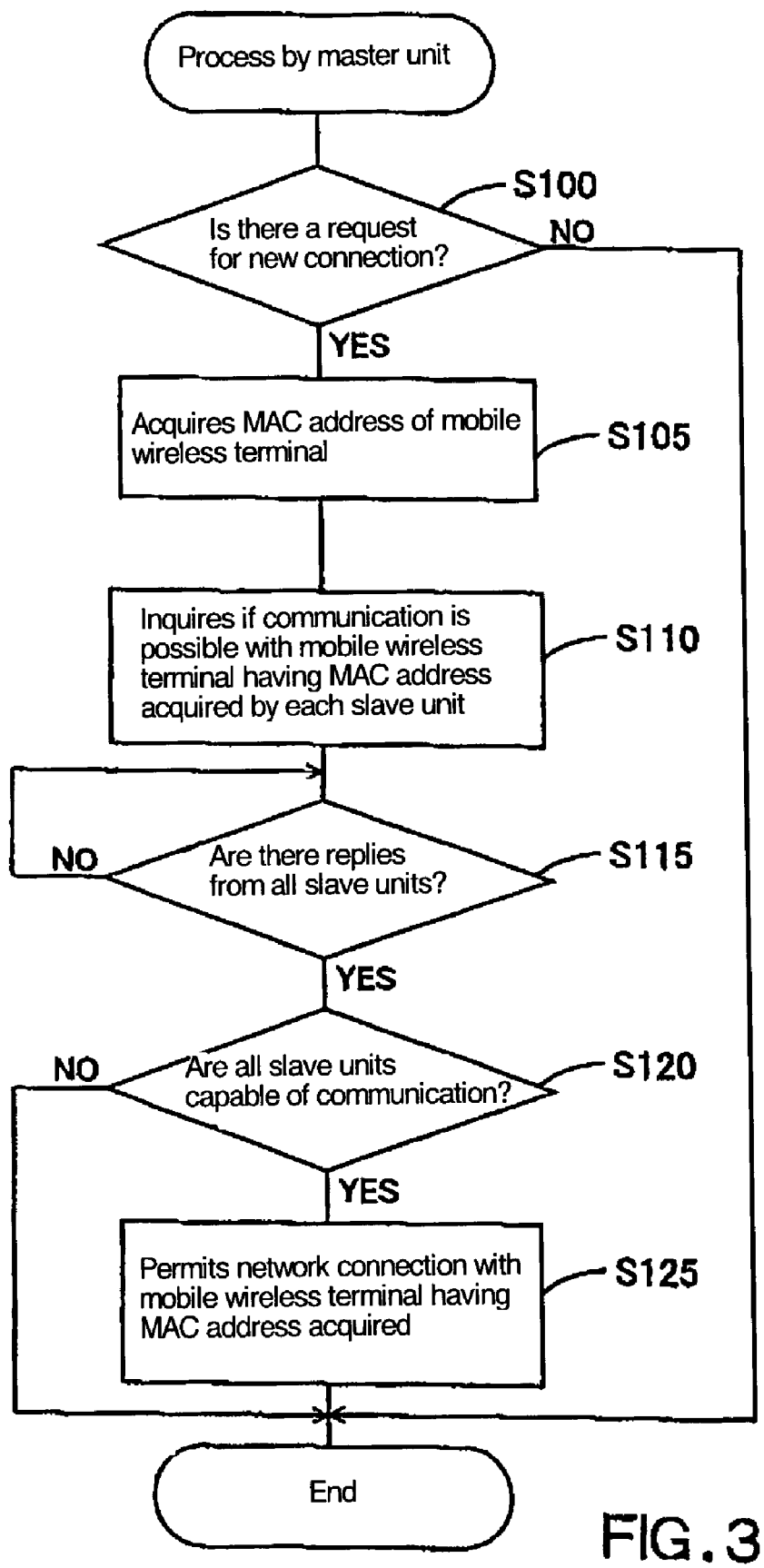
FIG. 3 is a block diagram showing the operation of the master unit.
Figure 4:
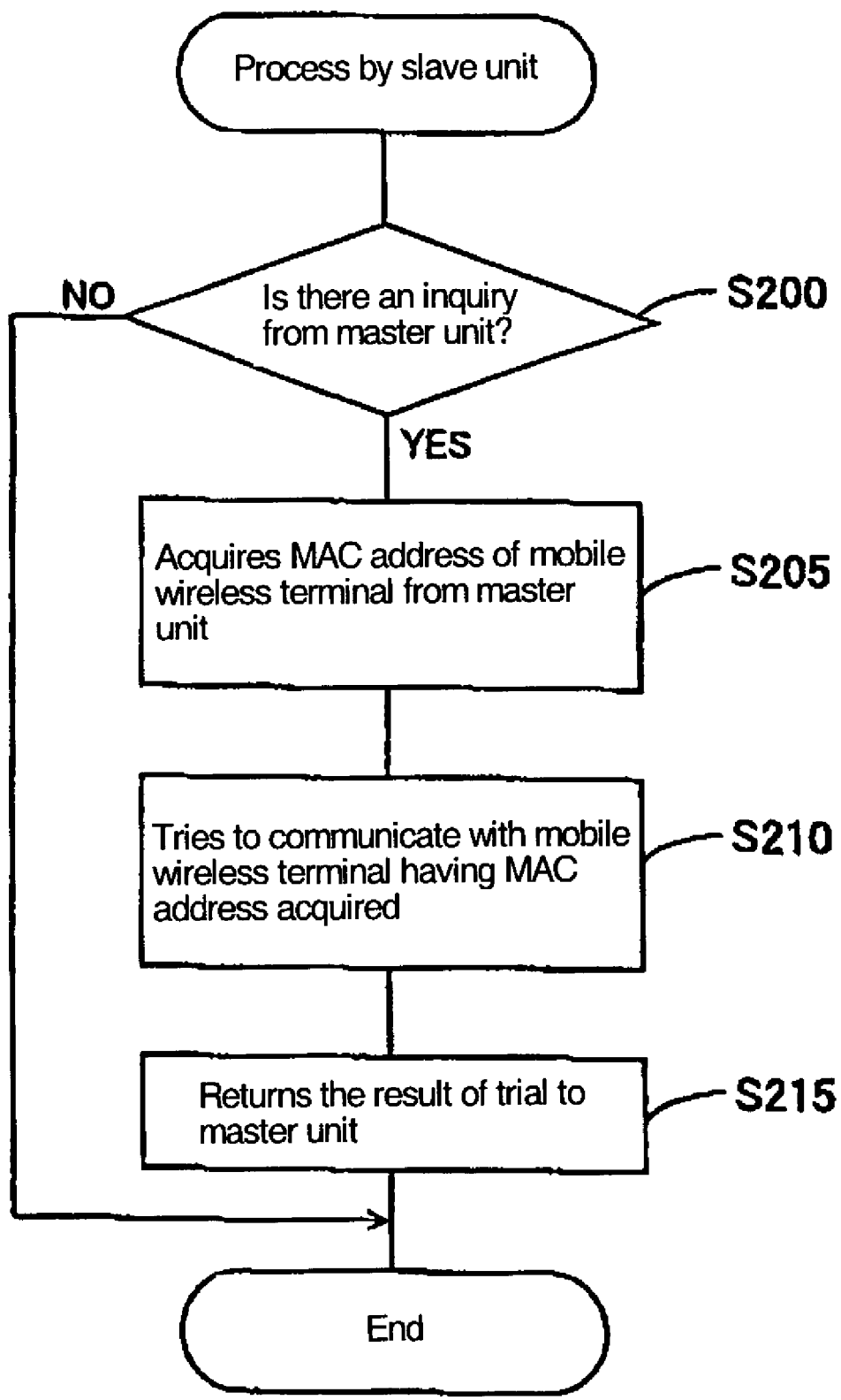
FIG. 4 is a block diagram showing the operation of the slave unit.

FIGS. 3 and 4 are flowcharts showing the steps which are executed by the master unit 100 and the slave units 200 and 300.

In FIG. 3, step S100 is for the master unit 100 to judge whether or not there is a request for new connection. The request for connection is made when the physical layer circuit 20 (including the above-mentioned antenna 29) transmits and receives wireless signals conforming to an appropriate communication procedure. The master unit 100 judges that there is no request for new connection unless any mobile wireless terminals exist in the communication area.

When a request for new connection is detected, the master unit 100 (in step S105) acquires the MAC address of the mobile wireless terminal which has requested for new connection. Then, the master unit 100 (in step S110) gives a MAC address to the slave unit which has been connected, thereby asking the slave unit if it is ready for communication with the mobile wireless terminal having the MAC address. In this embodiment, this step is performed for the slave units 200 and 300. The master unit 100 (in step S115) waits replies from all the slave units.

At this stage, each slave unit responds as explained below with reference to FIG. 4. The slave unit (in step S200) judges whether or not there is a request from the master unit. As mentioned above, when the master unit receives a request for new connection, there is a request for inquiry to the slave unit. If the slave unit judges that there is a request, then it (in step S205) inquires and acquires the MAC address of the mobile wireless terminal which has been notified.

The slave unit (in step S210) tries communication with the mobile wireless terminal by using the MAC address thus acquired. In this example, the slave unit tries communication with the MAC address; however, it is only necessary to judge whether or not it is possible to communicate with the mobile wireless terminal having the notified MAC address.

The slave unit (in step S215) sends the master unit the result of trial for communication.

In FIG. 3, the master unit (in step S115) waits all replies from the slave units. When replies from all the slave units have been received, the master unit (in step S120) judges whether or not all the slave units are ready for communication.

If it turns out that all the slave units are ready for communication, the master unit allows network connection with the mobile wireless terminals. Incidentally, this flowchart only shows the steps up to permission for network connection; however, it may be modified as follows. The steps after step S110 are executed for the mobile wireless terminals for which network connection is permitted at certain time intervals, and judgment is made to see if all the slave units are ready for communication. An alternative modification may be made such that network services are suspended when communication with the master unit becomes impossible.

Providing network services to an unspecified mobile wireless terminal as mentioned above poses no problems in most cases so long as judgment is made to see if permission for network services should be issued when it enters the prescribed area. This is because it is usually impossible that a mobile wireless terminal (with permission for network services) continues to receive network services after it has left a specific communication area.

The embodiment constructed as mentioned above works in the following way.

First, it is assumed that the mobile wireless terminal 1 has entered range D and requested connection. This request for connection is received by the master unit 100 because range D is within the communication area of the master unit 100. The master unit 100 (in step S100) judges that there is a request for new connection. And the master unit 100 (in step S105) acquires the MAC address of the mobile wireless terminal 1. At the same time, the master unit 100 (in step S110) inquires of the slave units 200 and 300 whether or not communication is possible with the mobile wireless terminal 1 having the MAC address.

In response to this, the slave units 200 and 300 (in step S200) judge that there is a request, and they acquire the MAC address (in step S205) and try communication with the mobile wireless terminal 1.

The slave unit 200 judges that it is capable of communication with the mobile wireless terminal 1 having the acquired MAC address because its communication area is range B which is included in range D. Likewise, the slave unit 300 judges that it is capable of communication with the mobile wireless terminal 1 having the acquired MAC address because its communication area is range C which is included in range D.

Knowing that all the slave units are capable of communication, the master unit 100 (after judgment in steps S115 and S120) gives permission for connection with the network to the mobile wireless terminal 1 in step S125.

On the other hand, the mobile wireless terminal 2 is in the range C of the communication area of the master unit 100 and the communication area of the slave unit 3 but is not in the range B of the communication area of the slave unit 200. Therefore, the slave unit 200 (in step S215) informs the master unit 100 that communication with the mobile wireless terminal 2 was impossible. The master unit 100 (in step S120) judges that not all the slave units were capable of communication, and it does not permit connection with network services for the MAC address of the mobile wireless terminal 2.

(2) The Second Embodiment

Figure 5:
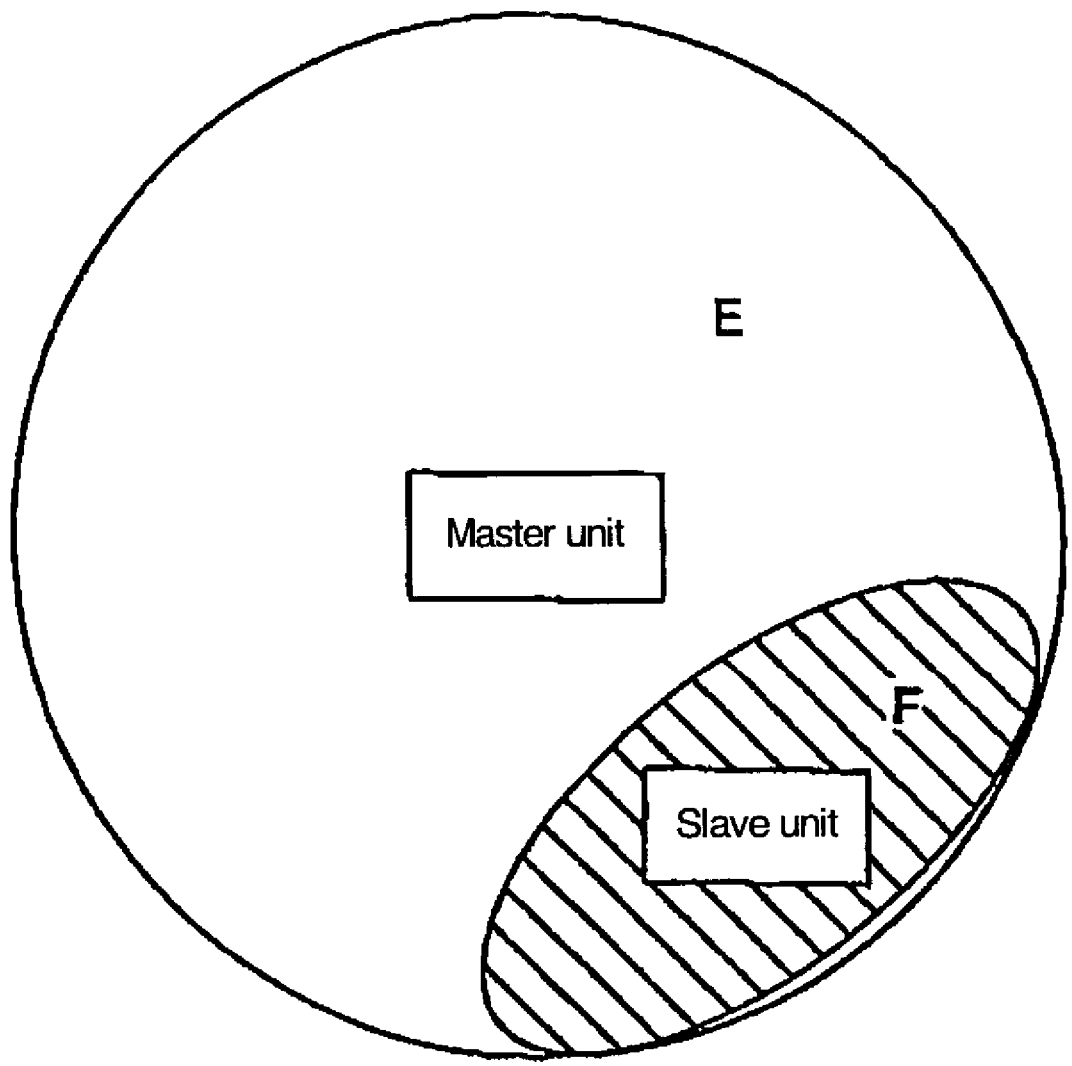
FIG. 5 is a schematic diagram showing the construction of the wireless LAN system pertaining to one modified embodiment of the present invention.

In the above-mentioned embodiment, the system has two slave units; however, it is not always necessary for the system to have a plurality of slave units. FIG. 5 shows the range E of the communication area of the master unit having a non-directional antenna and the range F of the communication area of the slave unit having a directional antenna. Network services are provided only in the area in which the range E and range F overlap each other.

In this case the master unit and the slave unit execute processes in the same way as in the flowchart shown in FIGS.

3 and 4. The master unit executes processes recognizing one slave unit as all the slave units.

(3) The Third Embodiment

The above-mentioned example was explained on the assumption that the slave unit is in the communication area of the master unit. The foregoing is applicable also to the case in which the slave unit is not in the communication area of the master unit if they have ranges which overlap with each other. In this case, it is assumed that the master unit and the slave unit are connected to each other through a network cable or incorporated into a wireless LAN system through a repeater.

Figure 6:
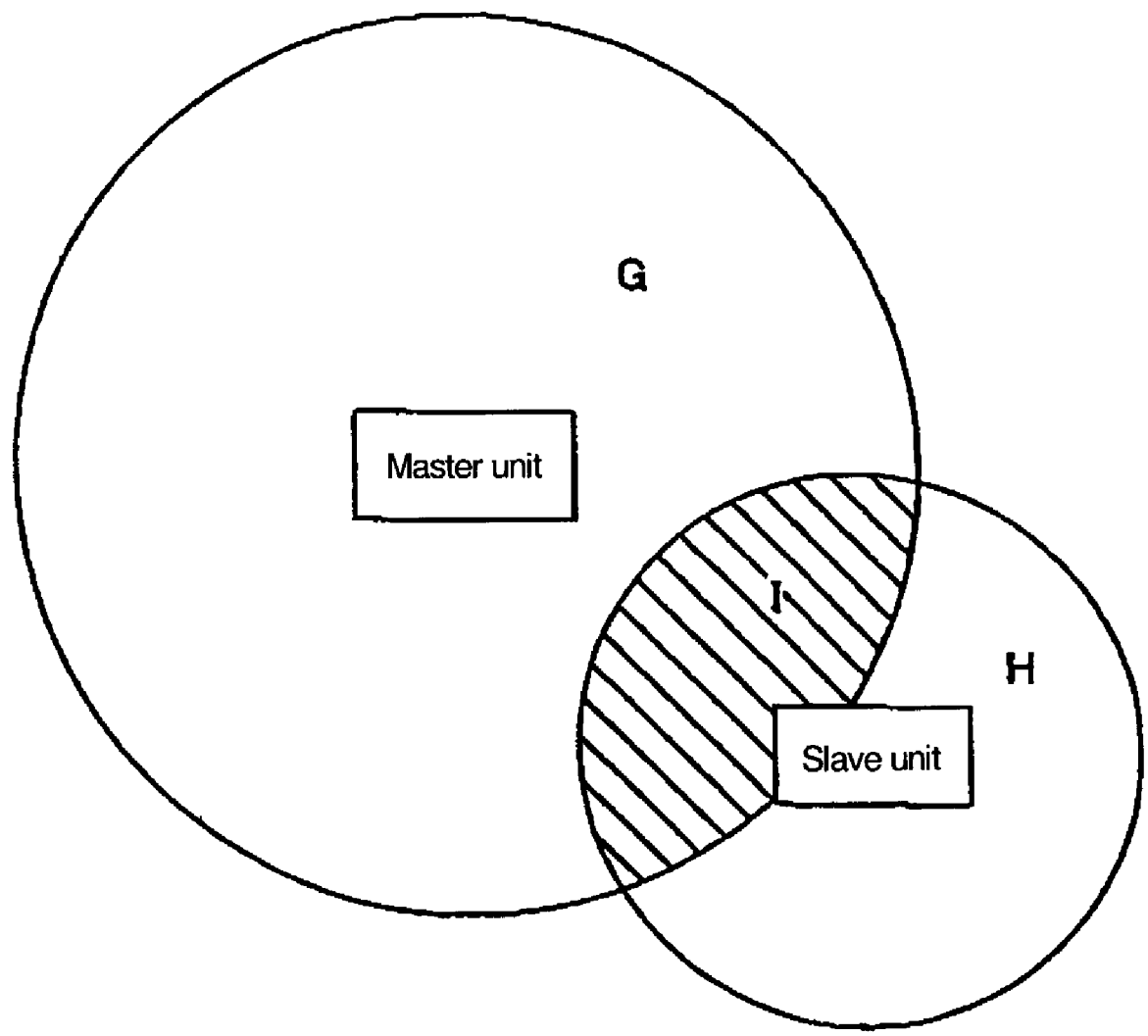
FIG. 6 is a schematic diagram showing the construction of the wireless LAN system pertaining to another modified embodiment of the present invention.

FIG. 6 illustrates such a situation. The master unit having a non-directional antenna covers the range G of its communication area; and the slave unit having also a non-directional antenna covers the range H of its communication area. Network services are provided only in the range I in which the range G and the range H overlap with each other.

(4) The Fourth Embodiment

The above-mentioned example illustrates a situation in which the master unit and the slave units are in all of the communication areas. It is possible to limit the range of the communication area on the condition that the slave unit does not enter the communication area.

Figure 7:
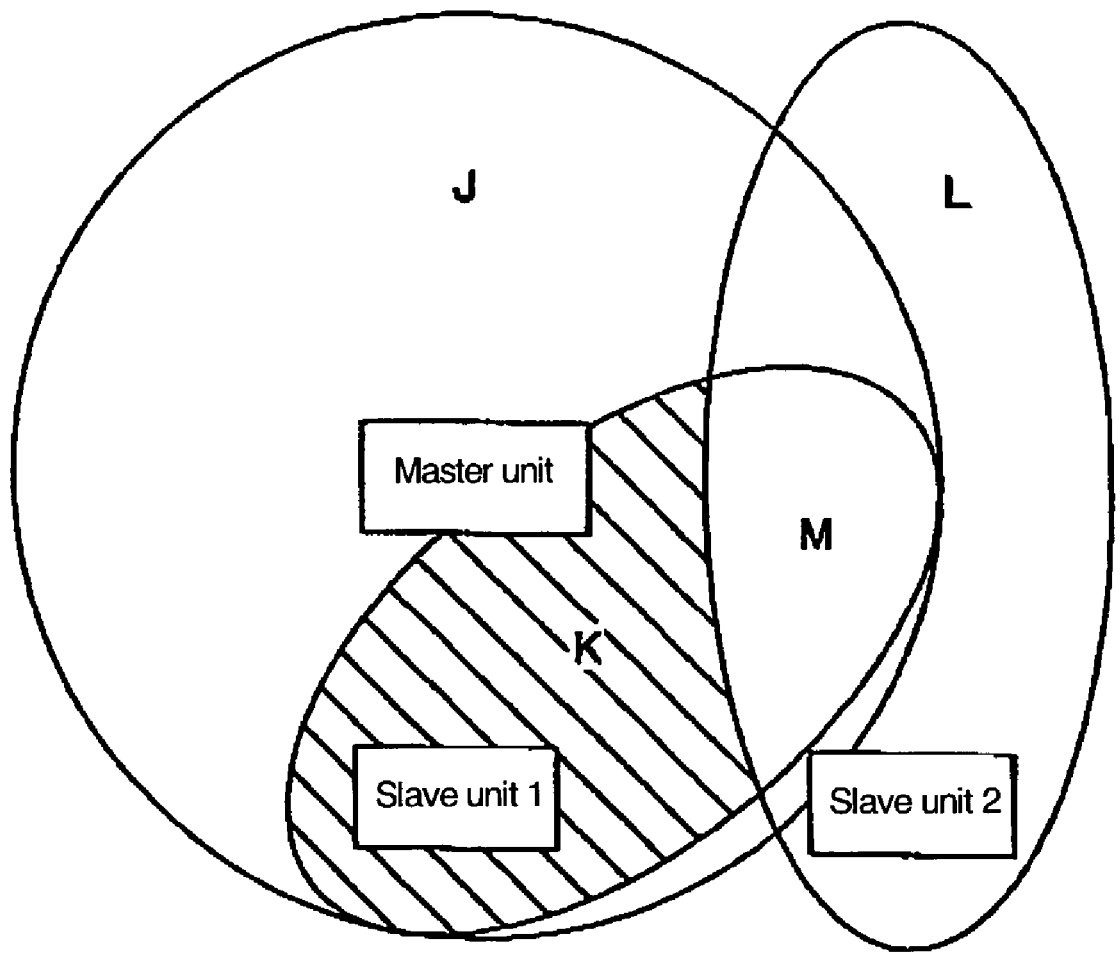
FIG. 7 is a schematic diagram showing the construction of the wireless LAN system pertaining to further another modified embodiment of the present invention.

FIG. 7 illustrates such a situation. In other words, it shows the range J of the communication area of the master unit having a non-directional antenna, the range K of the communication area of the slave unit having a directional antenna, and the range L of the communication area of the slave unit having a directional antenna. Network services are provided only in the range M in which the range J and the range K overlap with each other but which does not overlap with the range L.

Figure 8:
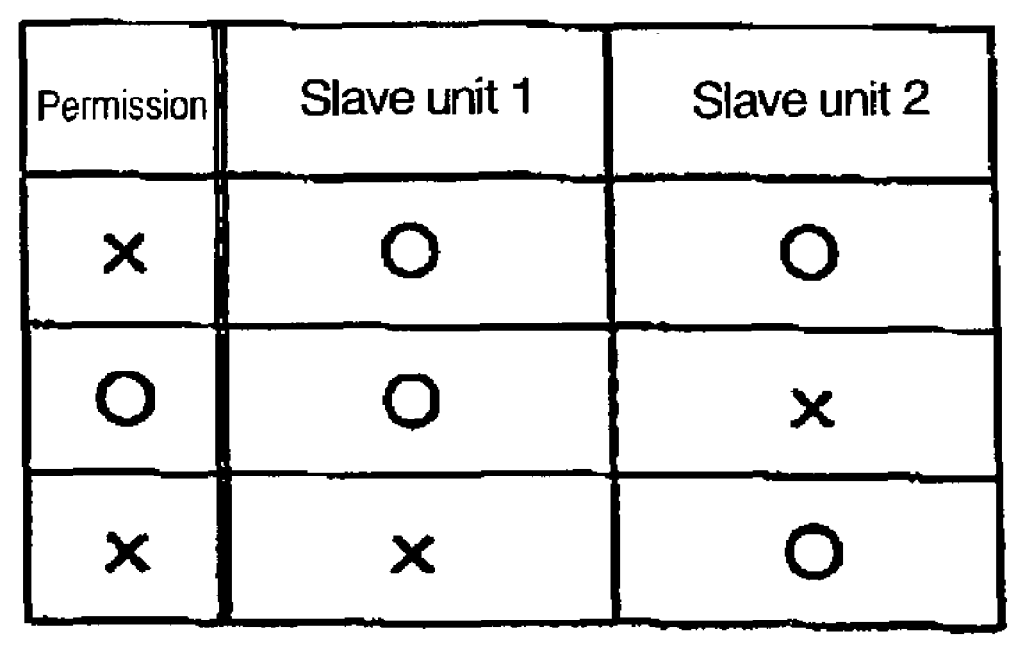

In order to realize such a combination, it is necessary to change step S120 as follows. (Step S120 is intended to make judgment to see if "all the slave units are capable of communication".) In other words, a table (as shown in FIG. 8) indicating the combination of readiness and permission of communication for slave units is previously prepared. This table is referenced (in step S120) according to the combination of replies from the slave units. Only in the case where communication is permitted, the process proceeds to step S125.

In this way it is possible to provide network services in an arbitrary region by properly combining the overlaps of the range of the communication area of the slave units in a situation in which there are different communication areas.

(5) CONCLUSION

As explained above, the present invention provides network services in the following manner. When the master unit 100 detects a mobile wireless terminal in its communication area (in step S100), it inquires of a plurality of slave units 200 and 300 if they are ready for communication with the mobile wireless terminal (in step S110). The master unit determines whether or not to provide network services to the mobile wireless terminal according to the combination of readiness for communication between each the slave units 200 and 300 and the mobile wireless terminal (in steps S120 and S125).

What is claimed is:

1. A wireless LAN system which comprises one master unit and one or more slave units, said master unit having a master antenna and functioning as a first access point to provide network services to mobile wireless terminals according to an appropriate communication procedure within an appropriate communication area, said slave unit functioning as a second access point having a slave antenna and being capable of detecting whether or not it can communicate with said mobile wireless terminal, said master unit functioning in such a way that when it detects a wireless terminal within its communication area, it inquires about readiness for communication from said slave antenna to said mobile wireless terminal and then determines whether to provide network services to said mobile wireless terminal in accordance with the combination of readiness of communication between said slave unit and said mobile wireless terminal.

2. A wireless LAN system as defined in claim 1, in which a plurality of slave units are installed.

3. A wireless LAN system as defined in claim 2, in which the master unit permits the slave unit to provide network services when all the slave units are capable of communication for the combination of readiness for communication between each slave unit and the mobile wireless terminal.

4. A wireless LAN system as defined in claim 2, in which the master unit permits the slave unit to provide network services in response to the combination of a slave unit capable of communication and a slave unit incapable of communication for the combination of readiness for communication between each slave unit and the mobile wireless terminal.

5. A wireless LAN system as defined in any of claims 1, in which the antenna of the slave unit is a directional antenna.

6. A wireless LAN system as defined in any of claims 1, in which the antenna of the master unit is a directional antenna.

7. A method for providing network services through a wireless LAN system which comprises one master unit and one or more slave units, said master unit having a master antenna and functioning as a first access point to provide network services to mobile wireless terminals according to an appropriate communication procedure within an appropriate communication area, said slave unit functioning as a second access point having a slave antenna and being capable of detecting whether or not it can communicate with said mobile wireless terminal, said master unit functioning in such a way that when it detects a wireless terminal within its communication area, it inquires about readiness for communication from said slave antenna to said mobile wireless terminal and then determines whether to provide network services to said mobile wireless terminal in accordance with the combination of readiness of communication between said slave unit and said mobile wireless terminal.

8. A medium storing a program for providing network services through a wireless LAN system which comprises one master unit and one or more slave units, said master unit having a master antenna and functioning as a first access point to provide network services to mobile wireless terminals according to an appropriate communication procedure within an appropriate communication area, said slave unit functioning as a second access point having a slave antenna and being capable of detecting whether or not it can communicate with said mobile wireless terminal, said master unit functioning in such a way that when it detects a wireless terminal within its communication area, it inquires about readiness for communication from said slave antenna to said mobile wireless terminal and then determines whether to provide network services to said mobile wireless terminal in accordance with the combination of readiness of communication between said slave unit and said mobile wireless terminal.

* * * * *